(12) United States Patent
Tung et al.

(10) Patent No.: US 8,657,500 B2
(45) Date of Patent: Feb. 25, 2014

(54) HIGH SPEED BEARING

(75) Inventors: Chao-Nien Tung, Hsinchu (TW); Han-Ching Liu, Hsinchu (TW); Lung-Wei Huang, Hsinchu (TW)

(73) Assignee: Newcera Technology Co., Ltd., Bandar Seri Bagewan (BN)

( * ) Notice: Subject to any disclaimer, the term of this patent is extended or adjusted under 35 U.S.C. 154(b) by 92 days.

(21) Appl. No.: 13/270,921

(22) Filed: Oct. 11, 2011

(65) Prior Publication Data

US 2012/0093451 A1 Apr. 19, 2012

(30) Foreign Application Priority Data

Oct. 12, 2010 (TW) .............................. 99134801 A

(51) Int. Cl.
*F16C 17/00* (2006.01)
*F16C 33/10* (2006.01)
*F16C 37/00* (2006.01)

(52) U.S. Cl.
USPC ............ 384/289; 384/129; 384/313; 384/322

(58) Field of Classification Search
USPC ......... 384/241, 276, 279, 286–291, 307, 311, 384/313–316, 322, 385, 386, 392, 397, 384/400; 310/90
See application file for complete search history.

(56) References Cited

U.S. PATENT DOCUMENTS

| 314,731 | A | * | 3/1885 | Siebert ........................... 384/385 |
| 701,292 | A | * | 6/1902 | Canda .............................. 295/17 |
| 706,906 | A | * | 8/1902 | Davis, Jr. ....................... 384/289 |
| 783,870 | A | * | 2/1905 | Knapp ............................ 384/286 |
| 1,489,466 | A | * | 4/1924 | Stern et al. ..................... 277/516 |
| 1,927,534 | A | * | 9/1933 | Wooler ........................... 384/474 |
| 3,503,660 | A | * | 3/1970 | Hideo ............................ 384/400 |
| 3,917,362 | A |  | 11/1975 | Stedman |
| 5,145,266 | A | * | 9/1992 | Saneshige et al. ............. 384/322 |
| 5,887,982 | A | * | 3/1999 | Wilcher ........................... 384/97 |
| 6,547,439 | B2 | * | 4/2003 | Chen .............................. 384/114 |
| 6,699,020 | B1 | * | 3/2004 | Lin ................................ 417/354 |
| 6,746,155 | B2 | * | 6/2004 | Chen ............................. 384/279 |
| 2002/0146183 | A1 | * | 10/2002 | Chen ............................. 384/397 |
| 2006/0171618 | A1 |  | 8/2006 | Shih |

FOREIGN PATENT DOCUMENTS

GB 1389857 4/1975

* cited by examiner

*Primary Examiner* — Alan B Waits
(74) *Attorney, Agent, or Firm* — Muncy, Geissler, Olds & Lowe, P.C.

(57) ABSTRACT

A bearing includes a housing and an assembly which consists of at least two elements. Each element has an axle hole to form an axial hole of the assembly run through by a shaft. At least one element has at least one set of multiple notches formed thereon directing towards at least one of two ends thereof to communicate with the axle hole, and at least one groove with an enlarged opening formed on the wall surface of the axle hole directing towards the notches. The groove on the wall surface of the axle hole has at least one set of multiple recesses formed thereon. The housing has a through axial cavity to house the assembly. The bearing has at least one storage chamber to store lubricating media. The notches on at least one set of adjacent elements form at least one set of multiple passages communicating with the storage chamber and the axial hole.

20 Claims, 16 Drawing Sheets

HIGH SPEED BEARING

TECHNICAL FIELD

The present disclosure relates to a bearing and particularly to a bearing that includes a module with adjacent elements to form continuous multi-channel dynamic-pressure and recyclable lubricating media between them to support a high speed spinning shaft.

DESCRIPTION OF RELATED ART

Conventional bearing usually is hard to long-term operation under a variety of severe operating conditions, such as abnormal high- and low-temperatures, heavy loading, high spinning speeds and strong vibration. After a short period of shaft spinning, lubricating media could be gradually exhausted. As a result of deteriorating tribology interface between axial hole and periphery of the spinning shaft, the shaft could be directly contacted with the axial hole to induce high frequency knocks and impacts, resulting in excessive abrasion and heat generation. So that abnormal signs such as electric current increase, noise generation, shaft scraping, enlarging of axial hole could take place and accelerate damage of the bearing. These are the urgent problems of the conventional bearing yet to be overcome.

US2006/0171618A1 proposes a self-lubrication bearing with a hollow assembly coupled on a shaft. The assembly has T-shaped two-stepped cylindrical struts coupled together through a smaller end to form an indented circumference, and a hollow barrel housing coupled on the assembly to form a storage chamber between them to store lubricating oil. A gap is formed on the connection surface of the storage chamber to allow the lubricating oil to seep and flow into the axial hole. However, lubricants of a higher viscosity cannot be used on the aforesaid bearing.

GB1389857A discloses another type of self-lubrication bearing with a hollow cylindrical barrel made from plastics by injection to couple on a shaft. The plastic element has a plurality of protrusive fin-shaped circular rings formed radially and spaced from each other axially, and a hollow barrel housing to couple on the circumference of the plastic element so that adjacent circular rings form a plurality of annular storage chambers to store lubricating media. The lubricating media seep and flow into the axial hole through a plurality of apertures formed in the storage chambers. But for the bearing made with a stronger structure through metal or ceramic material, other types of fabrication process have to be adopted. The structure is more complex, and the possibility of mass production is lower.

U.S. Pat. No. 3,917,362A discloses a self-lubrication bearing formed by coupling a hollow assembly on a shaft. The assembly has an annular groove formed radially in the center of the circumferential surface. A hollow barrel housing is provided to encase the circumferential surface so that the groove forms an annular storage to store lubricating grease. The groove has a plurality of apertures formed thereon to allow the lubricating grease to seep into the axial hole.

All the aforesaid conventional bearings do not provide dynamic pressure and lubricating media recycling mechanism, also lack adjustability in terms of supply channels of the lubricating media, and location and capacity of the storage chamber. They also are less flexible in terms of using diversified lubricating media. Their structures are more complex that reduce the possibility of mass production.

The aforesaid lubricating media generally means any material capable of providing lubrication effect between the spinning shaft and the axial hole of the bearing, including but not limited to lower viscosity lubricating oil and higher viscosity lubricant, such as grease and hybrid lubrication agent containing solid lubricating grains.

Accordingly, it is desirable to provide a novel lubricating means which can overcome the described limitations.

In an operation condition which requires the bearing to support a shaft spinning more than ten thousand RPM or even over one hundred thousand RPM a strong dynamic pressure and structure are needed to form a desired tribology interface and also maintain coaxial precision so that friction between the shaft and axial hole can be minimized.

SUMMARY OF THE INVENTION

The present invention aims to overcome the aforesaid disadvantages of the conventional techniques by providing a bearing that includes an assembly and a housing. The housing is a hollow tube with an axial cavity inside. The assembly consists of at least two elements, each element containing an axle hole, the axle holes of the at least two elements forming an axial hole of the assembly run through by a shaft. At least one element of the assembly has at least one set of multiple notches directing to at least one of two ends thereof to communicate with the axle hole, and also at least one groove with an enlarged opening on the wall surface of the axle hole directing towards the notches. The groove communicates with at least one set of multiple notch openings of the notches formed on the wall surface of the axle hole. The groove of the wall surface of the axle hole also has at least one recess formed thereon communicating with the notch openings. The assembly is encased in the cavity of the housing. The assembly has an outer wall incorporated with an inner wall of the housing and at least one set of adjacent elements that are surrounded to form at least storage chamber to store lubricating media. The notches and at least one set of adjacent elements in the assembly form at least one set of multiple passages communicating with the storage chamber and axle hole.

The invention provides a novel bearing structure consisting of at least two elements that is adjustable in loading length and the number and capacity of the storage chamber, and also provides uniform distribution of the lubricating media.

In one aspect the invention provides a bearing capable of storing a great amount of diversified lubricating media to extend and improve operation limit and lifespan thereof.

In another aspect the invention provides a bearing product platform with a modular design and simplified mass production process to facilitate control and improve quality and reduce costs.

In yet another aspect the invention provides a novel lubrication mechanism that continuously generates dynamic pressure and recycles lubricating media to provide strong support for the spinning shaft.

In still another aspect the invention provides a bearing development platform with a flexible design and versatile applications in response to varying tribology conditions of diversified industries.

The foregoing, as well as additional objects, features and advantages of the invention will be more readily apparent from the following detailed description, which proceeds with reference to the accompanying drawings.

DETAILED DESCRIPTION

Figure 1:
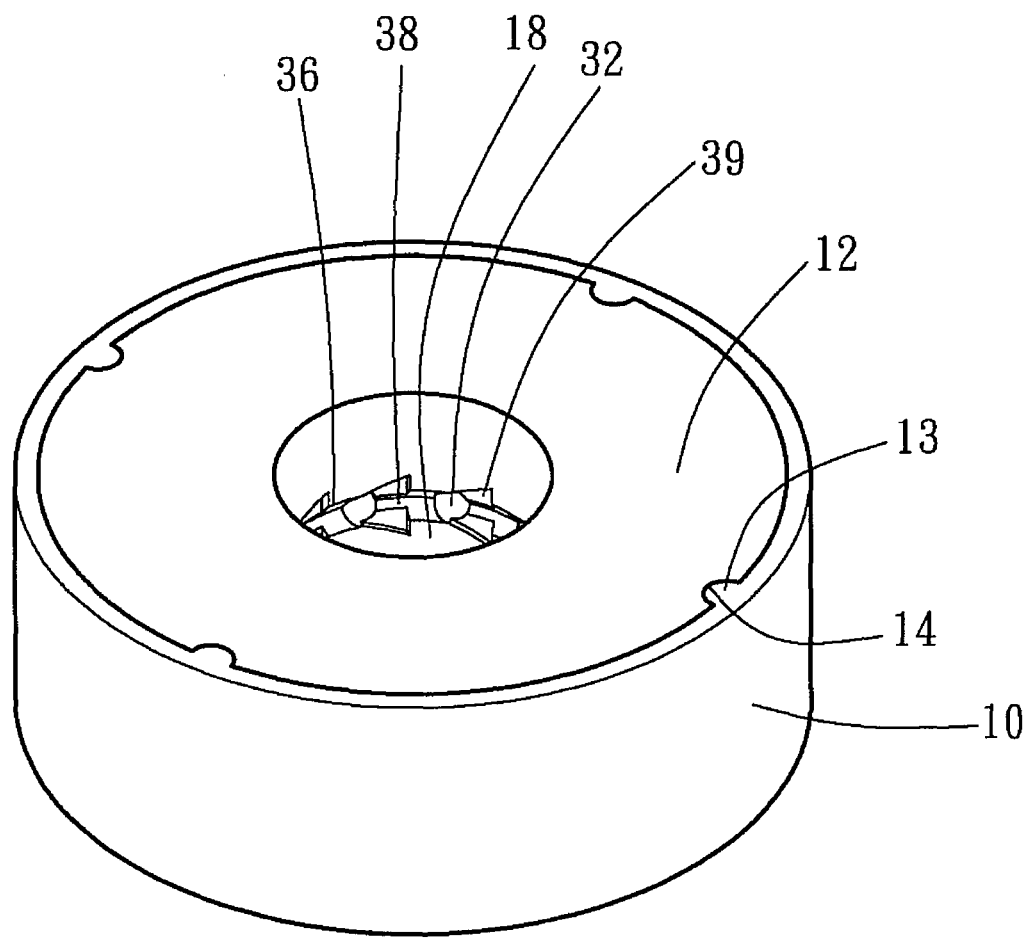
FIG. 1 is a perspective view of a first embodiment of the invention.
Figure 2:
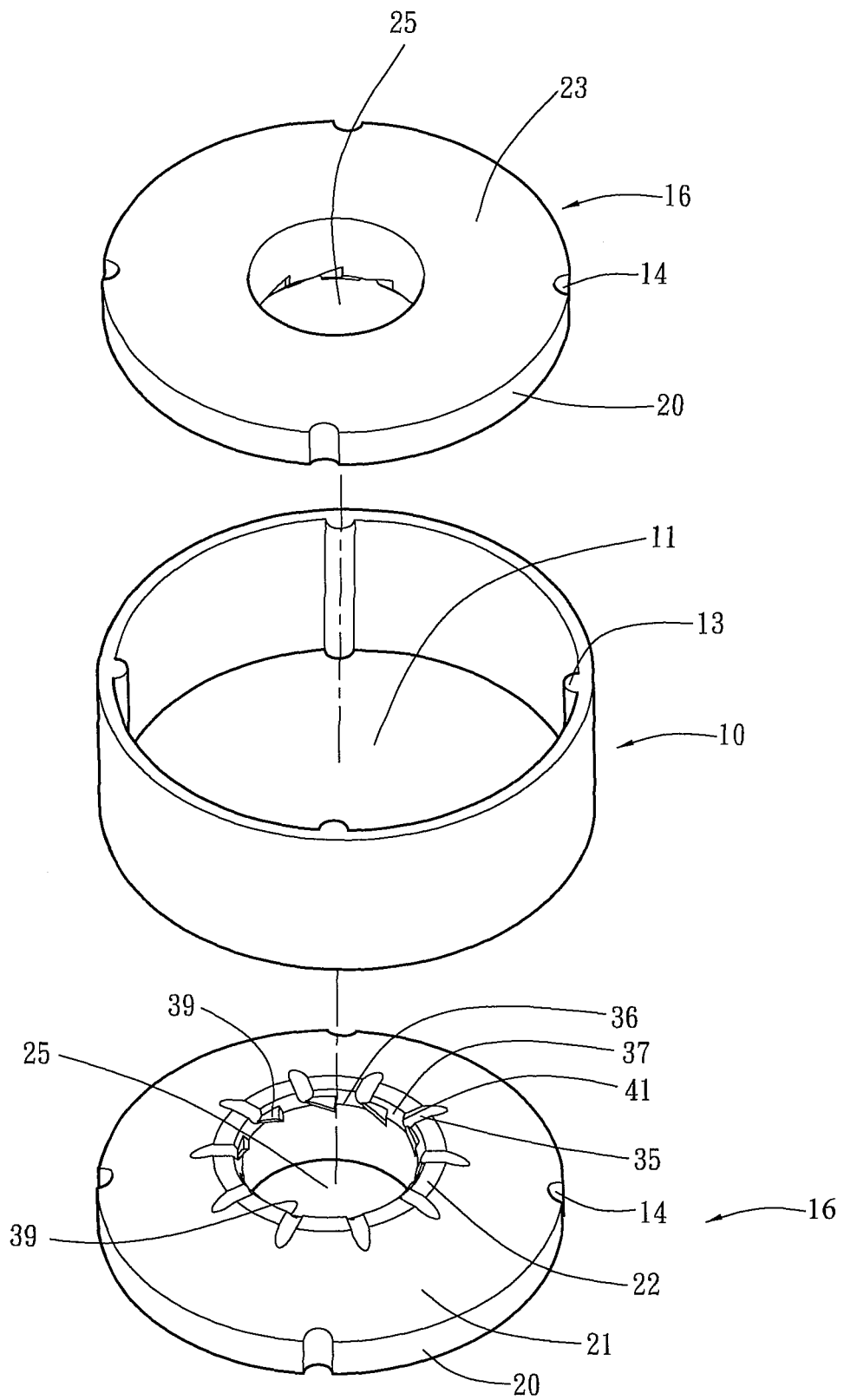
FIG. 2 is an exploded view of the first embodiment of the invention.
Figure 3:
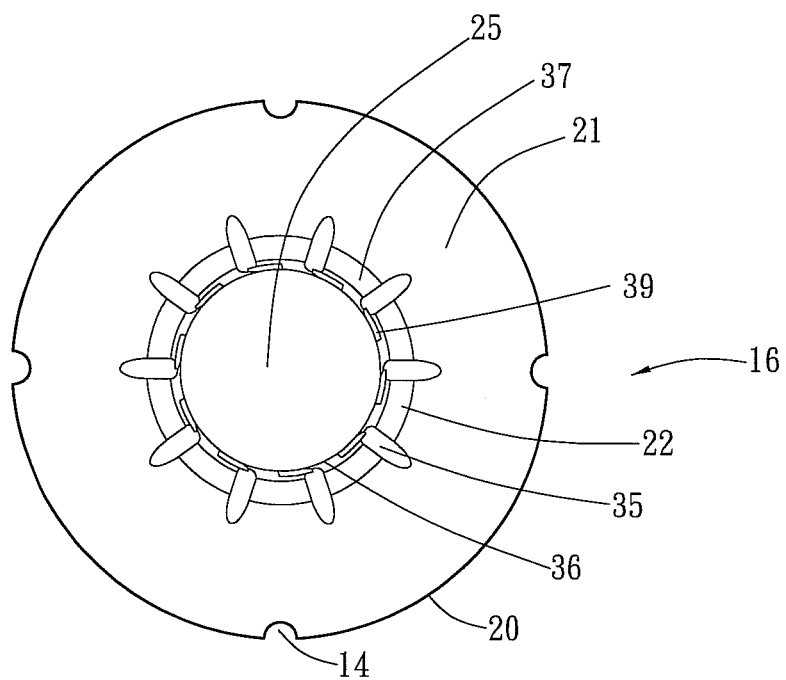
FIG. 3 is a top view of one type of element of the first embodiment.
Figure 4:
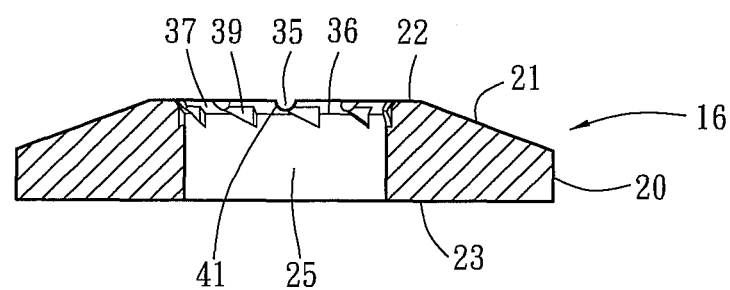
FIG. 4 is sectional view of one type of element of the first embodiment.
Figure 5:
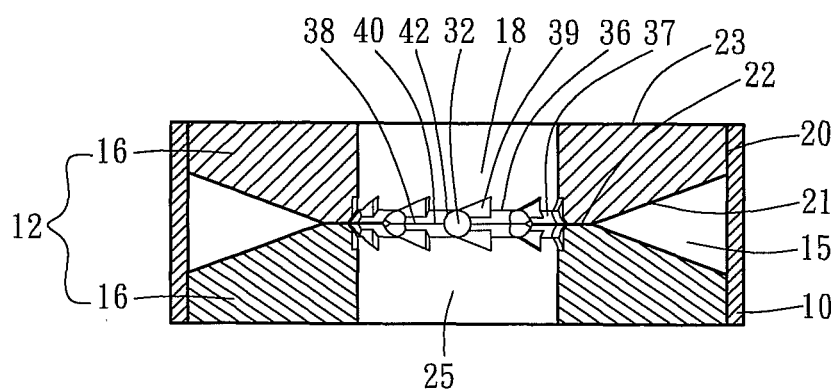
FIG. 5 is a sectional view of the first embodiment in an assembled condition.

Please refer to FIGS. 1 through 16 for detailed discussions of the bearing of the invention.

FIGS. 1 through 6 illustrate a first embodiment of the invention. The bearing of the invention includes a housing 10 and an assembly 12.

The housing 10 is a hollow tube with an axial cavity 11 to encase the assembly 12 to form a sturdy total bearing structure, and is made from a dense solid or porous material. The housing 10 has an inner wall surface with at least one axial rib 13 formed thereon.

The assembly 12 also is made from a dense solid or porous material, and includes two elements 16 coupled together axially. Each element 16 has an axle hole 25 run through axially. The axle holes 25 of these two elements 16 form an axial hole 18 of the assembly 12 for the insertion of a shaft to be supported by the high speed bearing. Each element 16 has a circumferential outer wall surface of a greater diameter to form a mounting portion 20. A waist portion 21 is formed by extending from a mounting portion 20 to the other end of the element 16. On the waist portion 21, the axial circumferential outer wall surface of any radial dimension from a center of the axle hole 25 is smaller than that of the mounting portion 20. The waist portion 21 has a distal end to form a connection portion 22 of the element 16. The element 16 has another end surface opposite to the connection portion 22 and proximate the mounting portion 20 to form the other connection portion 23. In practice, the circumferential outer wall surface of the waist portion 21 can be formed in different shapes; in various embodiments depicted herein a typical conical shape is used as an example to facilitate discussion. The element 16 has a free end on the connection portion 22 with one set of multiple notches 35 formed thereon annularly to communicate with the waist portion 21 and axle hole 25, and a groove 36 with an enlarged opening (such as a gradually expanded or tapered opening) formed on the wall surface of the axle hole 25 directing towards the notches 35. The groove 36 communicates with one set of notch openings 41 of the notches 35 formed on the wall surface of the axle hole 25. The groove 36 on the wall surface of the axle hole 25 further has a plurality of recesses 39 formed thereon communicating with the notch openings 41 such that the groove 36 becomes a plurality of connection grooves 37 to communicate two ends of the recesses 39. More specifically, a right triangle recess has one right angle side proximate and in parallel with the outer edge of the wall surface of the groove 36 and the other right angle side remote from the outer edge axially such that the vertex angle of the right triangle connects to a notch opening 41 in the spinning direction of the shaft so that the connection groove 37 connects to the vertex angle and bottom side of each recess 39.

When the connection portion 22 of two adjacent elements 16 are in contact and connected to each other, the notches 35 located thereon form one set of multiple passages 32 to allow lubricating media to seep and flow into the axial hole 18 to lubricate the shaft. The multiple passages 32 have an equivalent hydraulic diameter twice the notches 35. The two adjacent grooves 36 are coupled together to form a band type annular groove 38 to communicate with multiple passage ports 42 formed on the wall surface of the axial hole 18 by the multiple passages 32, with the annular groove 38 formed in a gradually shrunk cross section axially when viewed towards the passage ports 42. The wall surface of the axial hole 18 between the adjacent elements 16 also has pairs of recesses 39 formed thereon at a number same as the multiple passages 32 and a connection ditch 40 formed by the annular groove 38 to communicate two ends of the recesses 39, such that the recesses 39 are formed in right angle triangles and in pairs symmetrically and converged to each passage 32 in the shaft spinning direction. Moreover, the outer wall surface of the assembly 12 and inner wall surface of the housing 10 jointly form a surrounding storage chamber 15 with each other with a cross section of an isosceles triangle to store the lubricating media. The multiple passages 32 communicate the axial hole 18 and storage chamber 15. Thus forms the bearing of the invention. The lubricating media generally means lubricating oil, or grease or lubrication agent contained solid lubricating particles that have a higher viscosity than the lubricating oil.

To facilitate installation of the assembly 12, the circumferential outer wall surface of each element 16 also has locating notches 14 formed axially thereon to latch on ribs 13 formed on the inner wall surface of the housing 10 so that the axle holes 25 can be aligned precisely and coaxially to form the axial hole 18, and the recesses 39 can be arranged symmetrically and total structural strength also can be enhanced. In practice, the ribs 13 may also be formed on the mounting portion 20 and the locating notches 14 formed on the housing 10 to mate each other for latching together to achieve the same result.

The axial cross section of the storage chamber 15 can be formed in various shapes according to the profile of the waist portion 21 of the adjacent elements 16, such as rectangular, arched shapes, polygons and the like. The profile of the storage chamber 15 shown in this embodiment merely serves for illustrative purpose and is not the limitation of the invention.

The shape, number and size of the notches 35 can be adjusted as desired to allow the lubricating media in the storage chamber 15 to flow steadily between the inner wall surface of the axial hole 18 and outer wall surface of the shaft in response to different tribology conditions, thus can greatly extend and improve operation limit and lifespan of the bearing.

When the shaft spins in the axial hole 18 of the bearing the lubricating media in the storage chamber 15 is expanded due to receiving heat generated by tribology. As a result, the viscosity of the lubricating media reduces and fluidity increases. Hence the lubricating media can flow via the multiple passages 32 into the axial hole 18. In addition, during spinning of the shaft a centrifugal force is generated to reduce the pressure of the multiple passages 32 towards the axial hole 18, while the pressure towards the storage chamber 15 is higher. The pressure difference at two ends of the multiple passages 32 can further push the lubricating media from the storage chamber 15 to the axial hole 18. Therefore the lubricating interface between the axial hole 18 and shaft is much thicker than the conventional self-lubricating bearings pre-infiltrated with lubricating oil of a lower viscosity. Moreover, because the elements 16 are made of porous material and also can be pre-infiltrated with lubricating oil, aside from the lubricating mechanism to provide the lubricating media between the axial hole 18 and shaft through the storage chamber 15 and multiple passages 32 as previously discussed, the lubricating oil contained in the porous material also can be supplied through capillary forces to form an improved lubricating interface to further enhance tribology effect.

Furthermore, when the shaft is spinning in the axial hole 18 at high speeds, it impacts and squeezes the lubricating media in annular groove 38 of the gradually shrunken cross section that is supplied by a passage 32 approaching the shaft to form a dynamic pressure to support the shaft, and heat generated by friction between the shaft and the wall of the axial hole can be reduced. It also immediately pushes the lubricating media via another neighboring passage 32 into the storage chamber 15 to reduce loss of the lubricating media. The invention, by providing multiple pairs of recesses 39 in annular groove 38 with a gradually shrunk profile corresponding to the passage ports 42 in the spinning direction, can further increase the squeeze effect to converge the lubricating media, thereby can further enhance the dynamic pressure and hold the lubricating media without being thrown away during high speed spinning. Thereafter, the shaft spins in the gradually shrunk annular groove 38 and recesses 39 to a next passage 32 to get supply of the lubricating media therefrom, and also squeezes and converges the lubricating media supplied by the approaching passage 32 to form another dynamic pressure to support the shaft; then pushes the lubricating media into the storage chamber 15 again via yet another neighboring passage 32. Thus with the shaft spinning cyclically in the annular groove 38 and recesses 39 to squeeze and converge the lubricating media supplied by the approaching passage 32, a continuous dynamic pressure to support the shaft is formed; through the annular groove 38 and recesses 39, the lubricating media can be recycled and stored in the storage chamber 15 via the neighboring next passage 32. Therefore a multi-channel dynamic-pressure and recyclable lubricating media mechanism is formed to provide strong support for the spinning shaft. Because the bearing of the invention provides automatic replenishment and recyclable lubricating media, and a novel lubricating mechanism with continuous dynamic pressure is formed to provide strong support for the shaft, loading capacity and anti-vibration capability are enhanced, and prolong the lifespan.

Figure 6:
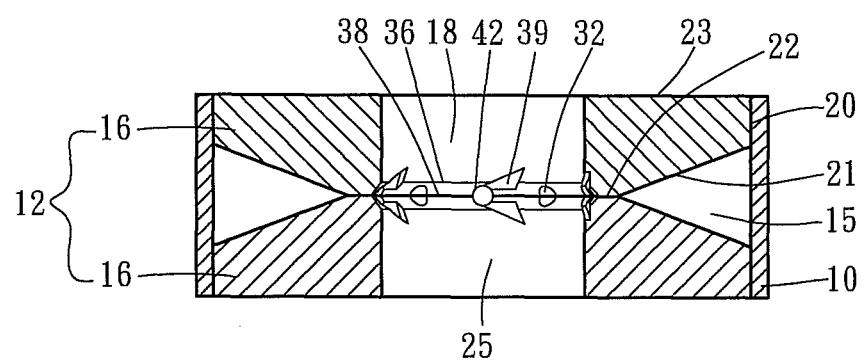
FIG. 6 is a sectional view of another type of element of the first embodiment.

To facilitate discussion, the recess 39 mentioned above is formed in a right triangle with the vertex angle located on the passage port 42 corresponding to each passage 32 in the shaft spinning direction. However, as a strong dynamic pressure is provided to support the shaft and the lubricating media can be automatically replenished and recycled, in practice there is no limitation in terms of the aforesaid design and arrangement. For instance, FIG. 6 illustrates a variation in which a triangle or polygon is formed with an acute angle located on one passage 32 and in a shape gradually shrinking towards the passage 32 in the shaft spinning direction. The recesses 39 thus formed are arranged in pairs spaced from each other on some of the multiple passages 32. The annular groove 38 communicates with the passage ports 42 on the wall surface of the axial hole 18 corresponding to the passage ports 42, thereby can achieve the effect similar to the recesses 39 previously discussed.

Figure 7:
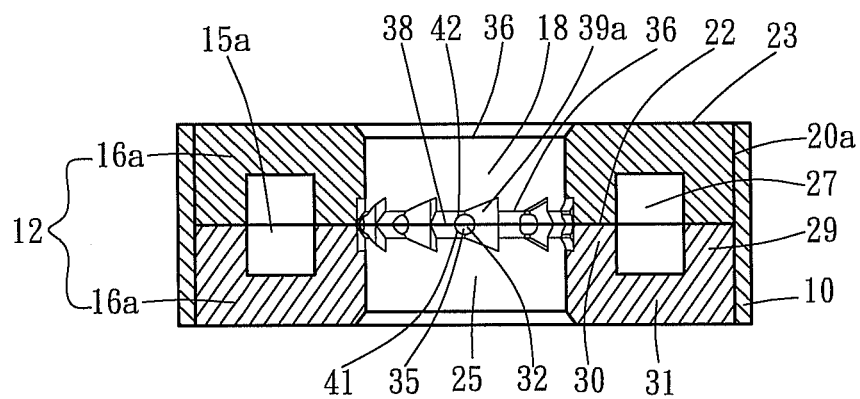
FIG. 7 is a sectional view of a second embodiment in an assembled condition.

FIG. 7 illustrates a second embodiment of the invention. The element 16a has the entire circumferential outer wall surface formed a mounting portion 20a with two end surfaces formed respectively connection portions 22 and 23. The element 16a also has a fillister 27 formed in a rectangular cross section and concaved axially towards the connection portion 22 and reached a bottom wall 31 thereof. The fillister 27 is formed by surrounding between an outer wall 29 near the mounting portion 20a and an inner wall 30 near the axle hole 25. The inner wall 30 has a free end with one set of multiple notches 35 formed annularly thereon to communicate with the fillister 27 and axle hole 25. The element 16a also has two end surfaces around the axle hole 25 to form respectively a groove 36 with a gradually expanded opening towards the connection portions 22 and 23. The groove 36 directed to the connection portion 22 communicates with one set of multiple notch openings 41 formed on the wall surface of the axle hole 25 corresponding to the notches 35. The groove 36 also has a plurality of right-triangle-shaped recesses 39a formed thereon each has its vertex angle directed in the shaft spinning direction to communicate with one notch opening 41, and a longer right-triangle side close to the connection portion 22 and a hypotenuse directed to each notch opening 41 to form a converging recess 39a. The assembly 12 is formed by coupling two elements 16a axially via connection of the adjacent connection portions 22, with the mounting portion 20a tightly encased in the inner wall of housing 10 such that the notches 35 of the adjacent elements 16a form one set of multiple passages 32 on the connection portions 22 to allow lubricating media to seep and flow into the axial hole 18 to lubricate the shaft. The two adjacent grooves 36 also are coupled to form a band type annular groove 38 with a gradually shrunk cross section to communicate with multiple passage ports 42 formed on the wall surface of the axial hole 18 corresponding to the multiple passages 32. The annular groove 38 communicates with multiple sets of paired recesses 39a which are gradually shrunk radially in the shaft spinning direction. The vertex angles of the paired recesses 39a communicate with the passage port 42 to form a recess of an isosceles triangle to substitute the two separated recesses 39 formed in the right triangles in the first embodiment previously discussed. The fillisters 27 between the two adjacent elements 16a are coupled via the connection portions 22 to form a surrounding storage chamber 15a with a rectangular cross section to store lubricating media. The storage chamber 15a has a capacity twice that of the fillister 27. The multiple passages 32 communicate with the storage chamber 15a and axial hole 18. Thus forms the bearing of this embodiment. When the shaft spins in the axial hole 18, through the annular groove 38 and recesses 39a, a strong dynamic pressure is generated and recyclable lubricating media mechanism is formed to support the shaft.

Figure 8:
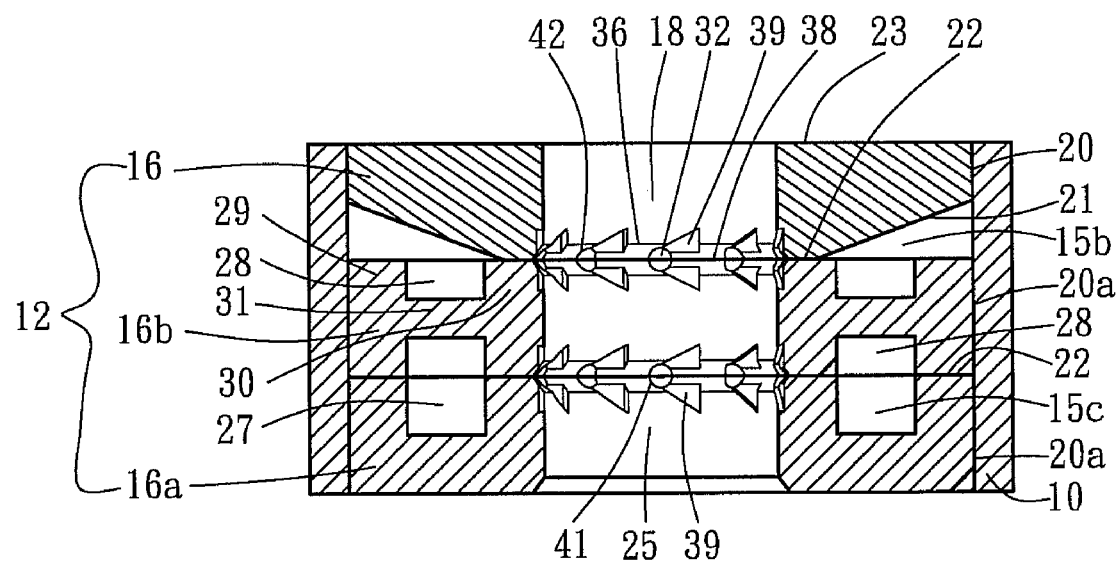
FIG. 8 is a sectional view of a third embodiment in an assembled condition.

Refer to FIG. 8 for a third embodiment of the invention. The assembly 12 includes three types of elements 16, 16a and 16b, and are arranged in two sets of adjacent elements 16 and 16a, and 16b and 16a, and tightly encased in the inner wall of the housing 10 via mounting portions 20 and 20a to form a bearing. The element 16*b* has two fillisters 28 concaved axially towards the two connection portions 22 and reached a bottom wall 31 thereof and each fillister 28 forms between an outer wall 29 proximate the mounting portion 20*a* and an inner wall 30 proximate the axle hole 25. Each inner wall 30 has a free end on which one set of multiple notches 35 are formed annularly to communicate with the fillister 28 and axle hole 25. The axle hole 25 has a wall surface at two ends formed respectively a groove 36 with a gradually expanded or tapered opening directing towards the connection portions 22. The two grooves 36 communicate with one set of multiple notch openings 41 formed on the wall surface of the axle hole 25 corresponding to the notches 35. The wall surface of the axle hole 25 directing to each connection portion 22 also has multiple sets of indented right-triangle-shaped recesses 39 formed thereon that are gradually shrunk radially in the shaft spinning direction. Two sets of adjacent notches 35 are coupled to form two sets of multiple passages 32. The element 16*b* has a fillister 28 incorporated with an outer wall surface of the waist portion 21 of the adjacent element 16 and the inner wall surface of the housing 10 to form a surrounding storage chamber 15*b* with a polygonal cross section. The element 16*a* has another fillister 27 and adjacent element 16*b* has another fillister 28 that are coupled to form another storage chamber 15*c* with a rectangular cross section. The two sets of multiple passages 32 communicate respectively with the two storage chambers 15*b* and 15*c* and axial hole 18. When the shaft spins in the axial hole 18, through two annular grooves 38 formed by two sets of adjacent grooves 36, a continuous dynamic pressure and recyclable lubricating media mechanism can be generated to provide strong support for the shaft.

Since the aforesaid elements 16*a* and 16*b* have the entire circumferential outer wall surface served as the mounting portions 20*a*, they can be encased tightly in inner wall of the housing 10 through the mounting portions 20*a*, therefore the axial hole 18 formed by the axle holes 25 is precise coaxially. Therefore, improved total structural strength and enhanced thermal conductivity of the tribology interface can be achieved.

Figure 9:
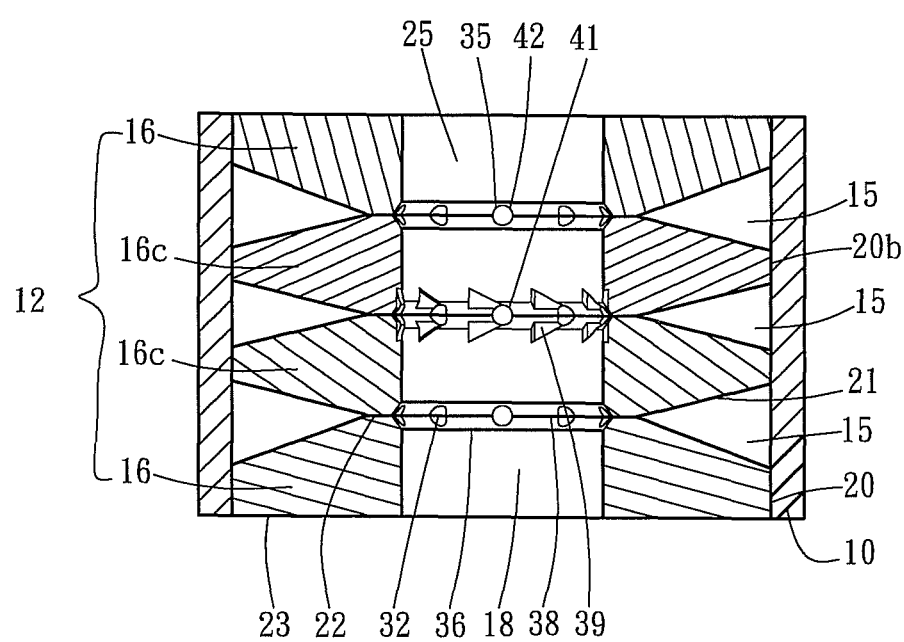
FIG. 9 is a sectional view of a fourth embodiment in an assembled condition.

Please refer to FIG. 9 for a fourth embodiment of the invention. It includes two types of elements 16 and 16*c* arranged in three sets of adjacent elements 16 and 16*c*, 16*c* and 16*c*, and 16*c* and 16, with mounting portions 20 and 20*b* tightly encased in the inner wall of the housing 10 to form a bearing. The element 16*c* is formed in a profile like a button with a mounting portion 20*b* formed with a greater radial circumferential outer wall surface in the axial center portion, and two waist portions 21 extended axially from the mounting portion 20*b* to two ends thereof. The circumferential outer wall surface of any radial dimension from a center of the axle hole 25 of the two waist portions 21 is smaller than that of the mounting portion 20*b*. The two waist portions 21 have distal ends to form respectively a connection portion 22. Each connection portion 22 has a free end with one set of multiple notches 35 formed thereon annularly communicating with the waist portion 21 and axle hole 25, and two grooves 36 with a gradually expanded or tapered openings formed on the wall surface of the axle hole 25 directing to the two connection portions 22. The grooves 36 communicate with multiple notch openings 41 of the notches 35 formed on the wall surface of the axle hole 25. The wall surface of the axle hole 25 directing to the two connection portions 22 further has a plurality of right-triangle-shaped recesses 39 gradually shrunk radially in the shaft spinning direction. The notches 35 on the three adjacent elements form three sets of multiple passages 32. The waist portions 21 of the four elements 16 and 16*c* incorporate with the inner wall surface of the housing 10 to form three storage chambers 15, each has a cross section of an isosceles triangle to store lubricating media. The multiple passages 32 communicate with the storage chambers 15 and axial hole 18. The grooves 36 on the three sets of adjacent elements 16 and 16*c*, 16*c* and 16*c*, and 16*c* and 16 further form three sets of annular grooves 38 each communicates one set of multiple passage ports 42 formed on the wall surface of the axle hole 25 corresponding to the multiple passages 32. The right-triangle-shaped recesses 39 formed between the adjacent elements 16*c* and 16*c* are symmetrical. When the shaft spins in the axial hole 18, through the three sets of annular grooves 38 and the recesses 39 mentioned above, a continuous multi-passage dynamic-pressure and recyclable lubricating media mechanism can be generated to provide strong support for the shaft.

Figure 10:
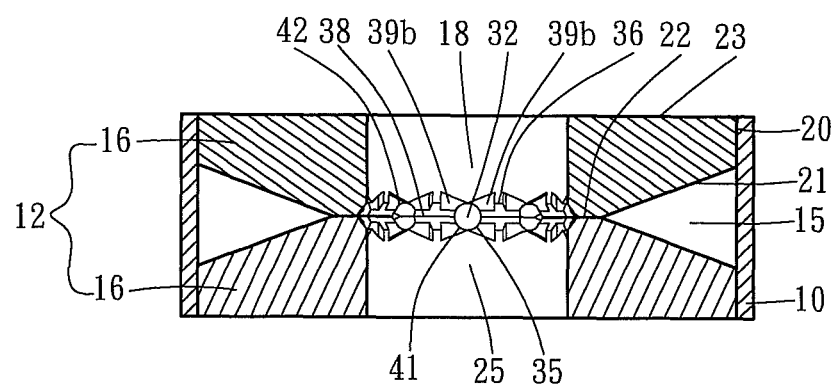
FIG. 10 is a sectional view a fifth embodiment in an assembled condition.

Refer to FIG. 10 for a fifth embodiment of the invention. It has an assembly 12 formed by connecting two connection portions 22 of two elements 16 and tightly encased in the inner wall of the housing 10 via a mounting portion 20 thereof to form the bearing. It differs from the first embodiment by each element 16 having multiple right-triangle-shaped recesses 39*b* formed in pairs on the wall surface of the axle hole 25 directing to the connection portion 22 and connected to each other via the vertex angles thereof. The recesses 39*b* communicate with one notch opening 41 of one notch 35 via the coupled vertex angles to replace the one-way right-triangle-shaped recess 39 with gradual axial shrinking in the shaft spinning direction to the notch opening 41 of an adjacent notch 35. Therefore, when the shaft spins in the axial hole 18, through one set of annular groove 38 formed by the adjacent grooves 36 and the passage ports 42 of the multiple passages 32 formed on the wall surface of the axle hole 25 communicating with the annular groove 38, and the annular groove 38 communicating with the paired recesses 39*b* symmetrical against the connection portion 22 formed as previously discussed, and the recesses 39*b* communicating with the passage port 42 via the connected vertex angles, a continuous multi-passage dynamic-pressure and recyclable lubricating media mechanism can be generated to provide strong support for the shaft via the multiple passages 32 and the communicated storage chamber 15 whether the shaft spins forwards or reverse. Application scope of the bearing thus formed can be expanded to products that require the shaft to spin at high speeds forward and reverse.

Figure 11:
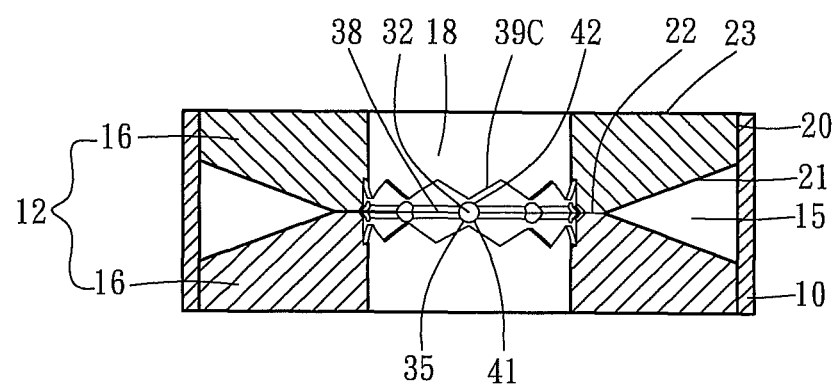
FIG. 11 is a sectional view of the fifth embodiment in another assembled condition.

FIG. 11 illustrates another type of coupling of the fifth embodiment. On each element 16 multiple pairs of right-triangle-shaped recesses 39*b* formed on the wall surface of the axle hole 25 directing towards the connection portion 22 are connected to each other via the vertex angles. First, each pair of recesses 39*b* connected via the vertex angles communicate with the notch opening 41 of one notch 35; then the bottom side of the adjacent recesses 39*b* at two sides are in contact with each other radially to form an isosceles-triangle-shaped recess 39*c* with two vertex angles communicating with the notch openings 41 of the adjacent notches 35. When the shaft spins in the axial hole 18, through the connected connection portions 22 of the two elements 16 which also have the mounting portions 20 tightly encased in the inner wall of the housing 10, the adjacent grooves 36 form one set of annular groove 38 communicating with the passage ports 42 formed by the multiple passages 32 on the wall surface of the axial hole 18 and multiple sets of the isosceles-triangle-shaped recesses 39*c*, hence the recesses 39*c* also communicate with the adjacent passage ports 42 via the vertex angles. As a result, a continuous multi-passage dynamic-pressure and recyclable lubricating media mechanism can be generated to provide strong support for the shaft via the multiple passages 32 and the communicated storage chamber 15 whether it is spinning forwards or reverse. Application scope of the bearing thus formed can be expanded to products that require the shaft to spin at high speeds and also forward and reverse. The recesses 39c previously discussed converge towards the neighboring notch openings 41, aside from generating continuous multi-passage dynamic-pressure and recycling of lubricating media to support the shaft in high speed spinning forwards and reverse, mold making can be simplified to facilitate mass production and also reduce costs.

Figure 12:
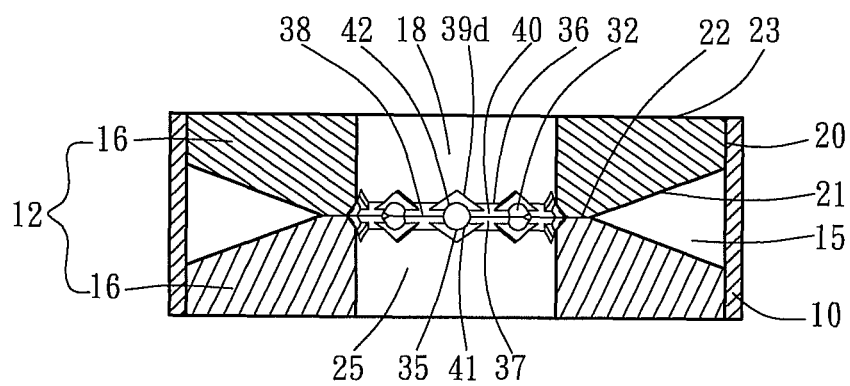
FIG. 12 is a sectional view of a sixth embodiment in an assembled condition.
Figure 13:
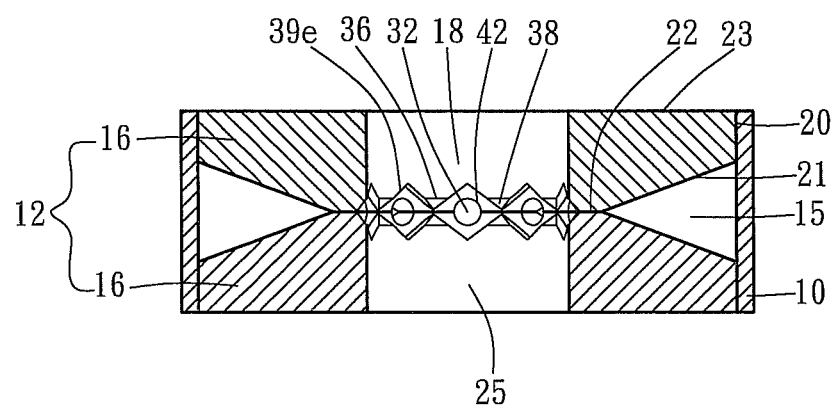
FIG. 13 is a sectional view the sixth embodiment in another assembled condition.

FIG. 12 depicts a sixth embodiment of the invention. It mainly differs from the fifth embodiment by adding multiple isosceles-triangle-shaped recesses 39d on the groove 36 of each element 16. The center of the long side of each recess 39d is located on the notch opening 41 of each notch 35 on the wall surface of the axle hole 25, and the groove 36 becomes multiple sets of rectangular connection grooves 37 communicating two ends of the recesses 39d. Each connection groove 37 communicates with the vertex angles of two adjacent recesses 39d. When two elements 16 are connected to each other via the connection portions 22 to form an assembly 12, the two adjacent grooves 36 form an annular groove 38 with a gradually expanded opening directing to the shaft. The annular groove 38 communicates with passage ports 42 formed by one set of multiple passages 32 on the wall surface of the axial hole 18. Moreover, the wall surface of the axial hole 18 has the paired recesses 39d formed thereon at a number same as that of the multiple passages 32. The paired recesses 39d are positioned with the longer sides of the two isosceles triangles in parallel with each other, and with the center of the longer sides communicating with the passage port 42. The connection grooves 37 of the assembly 12 further are combined to form multiple connection ditches 40 communicating respectively and radially with two pairs of vertex angles of two adjacent recesses 39d. Also referring to FIG. 13, the multiple sets of the paired and isosceles-triangle-shaped recesses 39d can also be extended sideward via two short sides of the same length. Then the two adjacent grooves 36 on the wall surface of the axial hole 10 of the assembly 12 form an annular groove 38 which has paired and isosceles-triangle-shaped recesses 39e formed thereon at a number same as the multiple passages 32 and also formed in a rhombic shape with the center located on the passage port 42 of each passage 32. The adjacent recesses 39e are connected to each other via two vertex angles in a staggered manner.

The annular groove 38 previously discussed can squeeze and converge the lubricating media supplied via the approaching passage 32 at the center of the recesses 39d and 39e by rolling cyclically with spinning of the shaft, and also push the lubricating media towards the recesses 39d and 39e in the shaft spinning direction, and converge on the vertex angles to form a dynamic pressure to support the shaft; then distribute the lubricating media via the connection ditch 40 of the recesses 39e or directly through the next recesses 39d or 39e, and at the same time recover the lubricating media through the gradually shrunk annular groove 38 via the multiple passages 32, therefore can reduce loss of the lubricating media, and also form a strong multi-passage dynamic pressure and recyclable lubricating media mechanism to support the shaft. The aforesaid function does not change with different spinning directions. Hence this embodiment is adaptable to high speed bearings used on motors that require spinning in forward and reverse directions.

Figure 14:
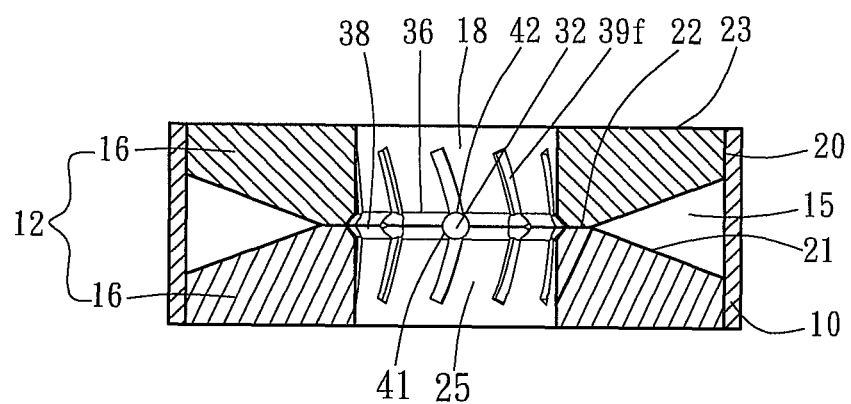
FIG. 14 is a sectional view of a seventh embodiment in an assembled condition.
Figure 15:
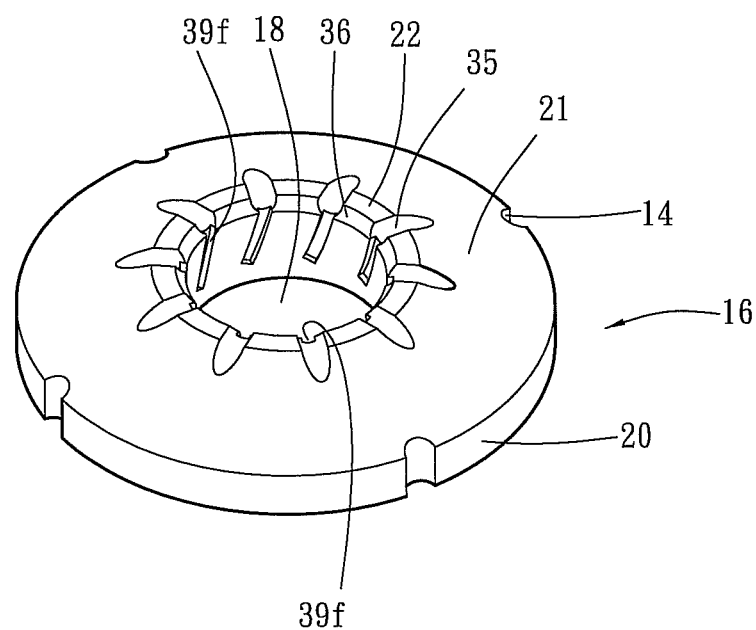
FIG. 15 is a perspective view of an element of the seventh embodiment.

FIGS. 14 and 15 illustrate a seventh embodiment of the invention. The assembly 12 consists of two elements 16 connected together via the connection portions 22 and is tightly encased in the inner wall of the housing 10 to form a bearing of the invention. The element 16 differs from the first embodiment by having a slant-wing-shaped recess which has a vertex at one end near a notch opening. The recess is extended from the vertex towards the connection portion remote from the notch opening such that the slant-wing-shape recess and the connection portion facing the notch opening form an acute vertex angle in the shaft spinning direction. The element 16 has notch openings 41 of multiple notches 35 formed on the wall surface of the axle hole 25 towards the connection portion 22 that become the vertex at one end of the recesses 39f. The slant-wing-shape recess is formed by extending from the vertex towards the connection portion 23 remote from the notch opening 41 such that the recess 39f and the connection portion 22 facing the notch opening 41 form an acute vertex angle. Thereby, the vertex angle converges in the shaft spinning direction to replace the triangular recess 39 with gradual and radial shrinking in the spinning direction to the notch opening 41. When the shaft spins in the axial hole 18, through one set of annular groove 38 formed by the adjacent grooves 36 and the multiple sets of paired slant-wing-shaped recesses symmetrically located against the annular groove 38 with the passage ports 42 of the multiple passages 32 served as the vertex to form multiple λ-shaped recesses with an included angle converged in the shaft spinning direction, and the λ-shaped recesses converge at the passage port 42. The annular groove 38 communicates with the multiple slant-wing-shaped recesses 39f formed in an extended and paired manner and shrunk gradually in the shaft spinning direction to reach the passage ports 42, hence a wider wall surface of the axial hole 18 can be covered to expand the dynamic pressure covering range, therefore can further enhance squeezing and converging of the lubricating media during shaft spinning, and the lubricating media can be evenly distributed due to the dynamic pressure generated in the spinning direction and recyclable lubricating media mechanism also can be accomplished. In practice, the λ-shaped recesses or slant-wing-shaped recesses 39f may also be formed at two sides of the annular groove 38 or any locations of any side of the groove 36 directing towards the connection portion 23 to achieve the same effect of converging to the passage port 42.

Figure 16:
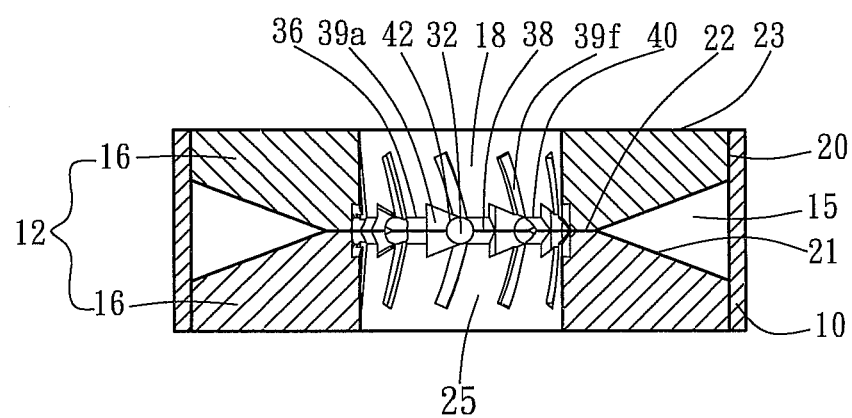
FIG. 16 is a sectional view of an eighth embodiment in an assembled condition.

FIG. 16 depicts an eighth embodiment of the invention. It mainly differs from the previous embodiment by incorporating the triangle-shaped recesses 39a and the slant-wing-shaped recesses 39f in the two elements 16 of the assembly 12 to generate continuously even more powerful dynamic pressure support and recyclable lubricating media effect for the high speed bearing. It is obvious that the slant-wing-shaped recesses 39f depicted previously in the seventh embodiment can also be incorporated with other embodiments at the same time and coexist with other types of recesses 39a, 39b, 39c, 39d and 39e to achieve same kind of effects as this embodiment does.

As conclusion, the invention provides a bearing capable of responding to different loading lengths of the shaft, and the number and capacity of the storage chamber can be expanded, and the type and injecting positions of the lubricating media also can be adjusted. Fabrication process for mass production also can be simplified to reduce production cost. Total structural strength is enhanced and thermal conductivity of the tribology interface improves. Moreover, strong dynamic pressure can be generated continuously, and the lubricating media can be recycled. It also can be used on applications that require the shaft to spin at high speeds in forward and reverse directions, thus can meet application requirements of diversified industries.

In the aforesaid embodiments, forming of the multiple passages can be made according to the formula below:

$$-2 \leq \log D \leq 0.5 \times \log(2 \times Sd \times H/N)$$

where N is total number of the multiple passages in the bearing, D is an equivalent hydraulic diameter of each passage by the unit of millimeter (mm), Sd is a diameter of the shaft by mm, and H is a length of the axial hole by mm.

In the discussion of various embodiments set forth above, aside from the features of the notches and recesses of the elements that are coupled to form the assembly 12, the elements of same series with the same sizes and profiles are adopted to facilitate discussion and highlight the benefits of the high speed bearing of the invention. In practice, there is no limitation for those elements in terms of the size, shape, quantity and arrangement fashion, hence what have been depicted in the embodiments shall not limit the scope of the invention.

In practical applications of the bearing, the circumferential outer wall surface of the mounting portion of each element may also have at least one axial rib formed thereon, and the inner wall surface of the housing also has at least one locating notch corresponding to the rib to latch with each other to achieve the same effects of various embodiments mentioned above.

In the various embodiments of the bearing set forth above, at least one set of adjacent elements is installed via definitive positioning so that two sets of adjacent notches are aligned with each other to form one set of multiple passages communicating with the annular groove, and two sets of adjacent recesses communicating with the groove also are aligned axially and symmetrically at two sides of the annular groove. The aforesaid arrangement aims to facilitate discussion. In practice, the shaft could spin in a high speed bearing at a speed more than tens of thousand RPM to pass swiftly through the multiple passages and recesses in the axial hole. Obviously, in the assembly, at least one set of adjacent elements may also be positioned randomly in the radial direction so that two sets of adjacent notches communicating with the groove can be arranged in a staggered manner to form one set of staggered multiple passages communicating with the annular groove, and two sets of adjacent recesses communicating with the groove also can be positioned axially in a staggered manner at two sides of the annular groove. The staggered multiple passages and the aligned multiple passages have a same equivalent hydraulic diameter, hence same function and benefits can be realized without complex and precise positioning during fabrication process.

In short, based on the techniques and features previously discussed, the invention can provide many advantages, notably:

1. Provides a novel bearing structure consisting of at least two elements. At least one element in the assembly has at least one free end with one set of multiple notches formed annularly thereon communicating with the axle hole, and at least one set of adjacent elements have the notches formed at least one set of multiple passages to transport lubricating media, and at least one storage is formed between the housing, assembly and adjacent elements to store the lubricating media. The loading length, and number and capacity of the storage chamber can be adjusted to evenly distribute the lubricating media.

2. Provides a bearing capable of storing a large amount of diversified lubricating media. Through different arrangements of the adjacent elements in the assembly diversified storage chambers and multiple passages can be formed to continuously establish an uniform and stable lubrication interface between the shaft and axial hole to improve tribology effect, thus greatly extend and improve operation limit and lifespan of the bearing.

3. Provides a bearing product platform with a modular design and simplified fabrication process to facilitate mass production. Mold design and making is simpler and the number of the molds required is fewer for mass production. During assembly the shape and size of the circumferential outer surface of the elements in the assembly mate the inner wall surface of the housing so that the axle holes are precisely aligned axially to form the axial hole and total structural strength also improves. No complicated and precise positioning is needed for alignment of the multiple passages and recesses on the adjacent elements. Hence fabrication process can be simplified to facilitate mass production, quality control and mass production are easier, and the cost can be greatly reduced.

4. Provides a novel lubricating mechanism with strong support for a shaft at high speed spinning. Through the shaft spinning in the annular groove to squeeze and converge the lubricating media supplied by a passage approaching the shaft a dynamic pressure to support the shaft is generated; then the lubricating media are recycled and stored in the storage chamber through a next passage. In addition, with multiple recesses added in the annular groove communicating with the passages, converging of the lubricating media is enhanced to further increase the dynamic pressure and reduce loss of the lubricating media so that strong dynamic pressure and recycling of the lubricating media are continuously generated to support the shaft both in forward and reverse high speed spinning.

5. Provides a bearing product platform with a flexible design and versatile applications. By adjusting various parameters, such as the shape, number, size and arrangement of the elements, the shape, forming method, location, number and size of the multiple passages, the shape and number of the grooves, the shape and number of the recesses, the number and capacity of the storage chamber, and the type and injecting location of the lubricating media, different types of bearings can be developed and made in response to varying tribology conditions and requirements of diversified industries.

While the preferred embodiments of the invention have been set forth for the purpose of disclosure, they are not the limitations of the invention, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A bearing, comprising:
   a housing which is a hollow tube with an axial cavity inside; and
   an assembly including at least two elements, each element including two opposite ends, each end forming a connection portion, the at least two elements including at least one set of two adjacent elements being axially coupled together with one of the two adjacent elements abutting against another one of the two adjacent elements to allow at least one set of two abutting connection portions of the at least one set of the two adjacent elements to be contacted therebetween to form the assembly, and a largest circumferential outer wall surface between two connection portions of each element forming a mounting portion to allow the assembly to be fixedly encased in and fully contacted with the cavity of the housing to form the bearing, each element also containing an axle hole axially running through the two opposite ends thereof, the axle holes of the at least two elements forming an axial hole of the assembly for insertion of a spinning shaft to be supported and lubricated by the bearing;

wherein at least one set of multiple notches is defined between the at least one set of the two adjacent elements of the assembly and annularly formed on at least one of the two abutting connection portions and communicated with the axle hole, each element further including at least one groove with an enlarged opening on a wall surface of the axle hole directing towards at least one of two connection portions, at least one set of multiple shaped recesses formed on the wall surface of the axle hole and communicated with the at least one groove, the bearing having at least one storage chamber to store lubricating media, the at least one set of multiple notches forming at least one set of multiple passages of the assembly to communicate with the at least one storage chamber and the axial hole.

2. The bearing of claim 1, wherein the at least one groove communicates with at least one set of multiple notch openings corresponding to the at least one set of multiple notches on the wall surface of the axle hole.

3. The bearing of claim 1, wherein the at least two elements of the assembly are axially coupled with each other to allow the at least one groove of each element to form at least one annular groove of the assembly which communicates with at least one set of multiple passage ports corresponding to the at least one set of multiple passages on a wall surface of the axial hole.

4. The bearing of claim 3, wherein the at least one set of the two adjacent elements of the assembly is installed randomly such that at least one pair of the at least one set of multiple notches respectively communicate with the at least one groove and are arranged in a staggered manner to form at least one set of staggered multiple passages communicating with the at least one annular groove, at least one pair of the at least one set of multiple shaped recesses—respectively communicate with the at least one groove to form at least one set of staggered multiple shaped recesses axially at two sides of the at least one annular groove.

5. The bearing of claim 3, wherein the at least one set of the two adjacent elements of the assembly is installed according to a selected position such that at least one pair of the at least one set of multiple notches respectively communicate with the at least one groove and are arranged in an aligned manner to form at least one set of aligned multiple passages communicating with the at least one annular groove, at least one pair of the at least one set of multiple shaped recesses respectively communicate with the at least one groove to form at least one set of symmetrical multiple shaped recesses axially at two sides of the at least one annular groove.

6. The bearing of claim 1, wherein the mounting portion is located on the circumferential outer wall surface close to one of the two connection portions of each element and axially concaved towards another connection portion to form a waist portion of each element, any circumferential outer wall surface of the waist portion having smaller radial dimension than the circumferential outer wall surface of the mounting portion, the at least one set of multiple notches communicating with the waist portion and the axle hole.

7. The bearing of claim 1, wherein the mounting portion is located on the circumferential outer wall surface between the two connection portions of each element and axially concaved towards the two connection portions to form two waist portions of each element, any circumferential outer wall surface of the waist portions having smaller radial dimension than the circumferential outer wall surface of the mounting portion, the at least one set of multiple notches communicating with at least one of the two waist portions and the axle hole.

8. The bearing of claim 1, wherein at least one fillister is defined between the at least one set of the two adjacent elements of the assembly and axially concaved from at least one of the two connection portions of each element to a bottom wall thereof and formed between at least one outer wall near the mounting portion and at least one inner wall near the axle hole, the at least one set of multiple notches annularly formed on at least one free end of the at least one inner wall and communicated with the at least one fillister and the axle hole.

9. The bearing of claim 8, wherein the at least one storage chamber is defined in the at least one fillister formed between the at least one set of the two adjacent elements of the assembly.

10. The bearing of claim 8, wherein the at least one storage chamber is defined between the cavity of the housing and a circumferential outer wall surface of the assembly and the at least one fillister.

11. The bearing of claim 1, wherein the at least one storage chamber is defined between the cavity of the housing and a circumferential outer wall surface of the assembly.

12. The bearing of claim 2, wherein each shaped recess of the at least one set of multiple shaped recesses is a triangle and includes a vertex angle communicating with each notch opening of the at least one set of multiple notch openings and converges in a shaft spinning direction.

13. The bearing of claim 2, wherein two neighboring shaped recesses of the at least one set of multiple shaped recesses are two triangles that include two vertex angles opposing each other and communicating respectively with each notch opening of the at least one set of multiple notch openings.

14. The bearing of claim 2, wherein each shaped recess of the at least one set of multiple shaped recesses is a triangle and includes two vertex angles communicating respectively with each notch opening of the at least one set of multiple notch openings.

15. The bearing of claim 2, wherein each shaped recess of the at least one set of multiple shaped recesses is a triangle and includes one side communicating with each notch opening of the at least one set of multiple notch openings.

16. The bearing of claim 2, wherein each shaped recess of the at least one set of multiple shaped recesses is formed in a slant-wing shape which includes a vertex at an end communicating with each notch opening of the at least one set of multiple notch openings and is extended from the vertex away from the connection portion of the notch opening to form an acute vertex angle between the shaped recess and the connection portion, the vertex angle converging in a shaft spinning direction.

17. The bearing of claim 1, wherein the mounting portion is formed in a shape and dimension mating a circumferential inner wall surface of the housing such that the at least two elements can be securely encased in the housing.

18. The bearing of claim 1, wherein the housing includes at least one rib axially extended on a circumferential inner wall surface and the mounting portion includes at least one locating notch on the circumferential outer wall surface corresponding to the at least one rib to latch each other.

19. The bearing of claim 1, wherein the mounting portion includes at least one rib axially extended on the circumferential outer wall surface and the housing includes at least one locating notch on a circumferential inner wall surface corresponding to the at least one rib to latch each other.

20. The bearing of claim 1, wherein the at least one set of multiple passages is formed according to the following formula:

$$-2 \leq \log D \leq 0.5 \times \log(2 \times Sd \times H/N)$$

where N is total number of the at least one set of multiple passages in the bearing, D is an equivalent hydraulic diameter of each passage (mm), Sd is a diameter of the shaft (mm), and H is a length of the axial hole (mm).

* * * * *